United States Patent
Tang et al.

(10) Patent No.: US 7,276,820 B2
(45) Date of Patent: Oct. 2, 2007

(54) MOVABLE ASSEMBLY FOR CYLINDER TYPE LINEAR MOTOR

(75) Inventors: Yuqi Tang, Nagano (JP); Satoshi Sugita, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 244 days.

(21) Appl. No.: 10/926,685

(22) Filed: Aug. 26, 2004

(65) Prior Publication Data

US 2005/0046282 A1    Mar. 3, 2005

(30) Foreign Application Priority Data

Aug. 27, 2003  (JP) .............................. 2003-303027
Aug. 23, 2004  (JP) .............................. 2004-242594

(51) Int. Cl.
*H02K 41/00* (2006.01)
(52) U.S. Cl. ...................................................... 310/12
(58) Field of Classification Search .................. 310/12, 310/13, 14, 216, 217, 218
See application file for complete search history.

(56) References Cited

U.S. PATENT DOCUMENTS

| | | | |
|---|---|---|---|
| 4,484,094 A | * | 11/1984 | Ade et al. ...................... 310/43 |
| 5,751,076 A | * | 5/1998 | Zhou ............................ 310/12 |
| 6,657,326 B1 | | 12/2003 | Yamamoto et al. |
| 6,700,295 B2 | * | 3/2004 | Kanno et al. ................ 310/261 |
| 6,703,806 B2 | * | 3/2004 | Joong et al. ................. 318/649 |
| 6,879,064 B2 | * | 4/2005 | Kobayashi et al. ........... 310/12 |

FOREIGN PATENT DOCUMENTS

| | | |
|---|---|---|
| DE | 25 41 599 | 3/1977 |
| DE | 29 38 379 | 4/1981 |
| JP | 2000-236653 | 8/2000 |
| JP | 2002-359962 | 12/2002 |

\* cited by examiner

*Primary Examiner*—Dang Le
*Assistant Examiner*—Nguyen Hanh
(74) *Attorney, Agent, or Firm*—Rankin, Hill, Porter & Clark LLP

(57) ABSTRACT

A movable assembly used in a cylinder type linear motor is provided which can be manufactured at low cost without requiring a cutting process while preventing its magnetic characteristics from deteriorating. The movable core is constructed of a laminated yoke which is formed of a plurality of electromagnetic steel plates laminated in an axial direction of the first and second direct drive shafts. A plurality of permanent magnets 31 fixed to the laminated yoke 29 are arranged in such a manner that the polarity appearing on the outer surface of the two permanent magnet 31 opposing each other through the laminated yoke 29. The first and second direct drive shafts each have a yoke mounting portion and paired supported portions at both axial ends of the yoke mounting portion. The first and second direct drive shafts are so shaped that the cross section of the yoke mounting portion orthogonal to the axial direction is smaller than that of the supported portions. Each of the electromagnetic steel plates is made up of first and second divided electromagnetic steel plate pieces of the same shape.

10 Claims, 12 Drawing Sheets

MOVABLE ASSEMBLY FOR CYLINDER TYPE LINEAR MOTOR

BACKGROUND OF THE INVENTION

The present invention relates to a movable assembly used in a cylinder type linear motor that reciprocally moves inside a stator of the cylinder type linear motor.

In conventional cylinder type linear motors, a movable core, considering a path of magnetic flux, employs a laminated structure in which silicon magnetic steel plates are laminated in such a manner that a radial direction of a direct drive shaft, on which the movable core is securely mounted, is a direction of lamination. Such a laminated structure is shown in FIG. 7 of Japanese Patent Disclosure No. 2000-236653. Japanese Patent Disclosure No. 2002-359962 discloses a construction of another cylinder type linear motor that this applicant proposed previously. In the cylinder type linear motor shown in the previous application, an array of permanent magnets is mounted on a square-columnar structured magnet mounting portion of the movable assembly.

The conventional movable core adopts the aforementioned laminated structure to reduce eddy current loss. However, as can be seen in Japanese Patent Disclosure No. 2002-359962, depending on the condition of operation no practical problem may arise even if the steel plate laminated structure is not used in the movable core. In light of a mass production of the movable core, the laminated structure such as shown in FIG. 7 of Japanese Patent Disclosure No. 2000-236653 is costly and not practical because the structure is complex and because two or more kinds of steel plates in different shapes need to be prepared. It is therefore more practical to form a movable core by cutting, as in the case of the movable core of Japanese Patent Disclosure No. 2002-359962. The structure of the latter movable core, however, is not suited to a low-cost production.

An object of this invention is to provide a movable assembly for a cylinder type linear motor which can be manufactured at low cost without requiring a cutting process while keeping its magnetic characteristics from deteriorating.

Another object of this invention is to provide a movable assembly for a cylinder type linear motor which can realize the above objective without increasing the kinds of parts used.

Still another object of this invention is to provide a movable assembly for a cylinder type linear motor whose magnetic characteristics are improved by adopting a rotation prevention structure.

Yet another object of this invention is to provide a movable assembly for a cylinder type linear motor which can be manufactured easily.

A further object of this invention is to provide a movable assembly for a cylinder type linear motor which is not easily damaged.

A further object of this invention is to provide a movable assembly for a cylinder type linear motor which enables the movable core to be formed more compactly.

A further object of this invention is to provide a movable assembly for a cylinder type linear motor which enables the movable core to be reduced in weight.

A further object of this invention is to provide a movable assembly for a cylinder type linear motor which can increase a connecting strength in an axial direction between the movable core and the direct drive shaft.

A further object of this invention is to provide a cylinder type linear motor which is less expensive than conventional motors.

SUMMARY OF THE INVENTION

The present invention concerns improvements on a movable assembly used in a cylinder type linear motor which has a linearly reciprocating movable core fixed to one or more direct drive shafts. In this invention, the movable core is constructed of a laminated yoke which has a plurality of electromagnetic steel plates laminated in the axial direction of the direct drive shafts. The laminated yoke has paired side surfaces which extend along the direct drive shafts and are so disposed as to face each other, with the direct drive shafts being therebetween. A plurality of permanent magnets are so fixed to each of paired side surfaces as to be juxtaposed in the axial direction of the direct drive shafts. In addition, the plurality of permanent magnets on one of the paired side surfaces are arranged in such a manner that the polarity appearing on an outer surface of one of the permanent magnets is different from that of the other permanent magnet adjacent to the one of the permanent magnets, and is also different from that of the opposing permanent magnet on the other side of the paired side surfaces. With this arrangement, magnetic fluxes flow between the opposing permanent magnets through the laminated yoke, which makes it difficult for the magnetic fluxes to flow in the direction of lamination of electromagnetic steel plates. Therefore the laminated yoke which hardly causes eddy current loss can be constructed by laminating the plurality of the electromagnetic steel plates in the axial direction of the direct drive shafts.

One or more direct drive shafts each have a yoke mounting portion to which the movable core is fixed and paired supported portions provided at both axial ends of the yoke mounting portion and supported by bearings. Each of the direct drive shafts may be a so-called straight type shaft whose cross section in the direction orthogonal to its axial direction is constant from one end to the other end. The direct drive shafts, however, are preferably shaped such that the yoke mounting portion has a smaller cross section in the direction orthogonal to the axial direction than that of the supported portions. With this configuration of the direct drive shafts, a required thickness of the laminated yoke can be fixed around the direct drive shafts even if the cross section in the direction orthogonal to the axial direction of the yoke mounting portion is made small. This in turn allows the laminated yoke to be reduced in the cross-sectional area and therefore to be formed more compactly and lighter than the conventional yoke. This results in an increased thrust of the linier motor and therefore an increased acceleration of the linear motor.

If the cross section of the yoke mounting portion is made small as described above, however, the laminated yoke cannot be fixed to the direct drive shafts simply by forming through holes in the laminated yoke and forcibly inserted the direct drive shafts into the holes. To deal with this problem, each of the electromagnetic steel plates making up the laminated yoke is constructed of a plurality of divided electromagnetic steel plate pieces. The divided electromagnetic steel plate pieces are so shaped, when combined to enclose the one or more direct drive shafts, as to be able to form one of the electromagnetic steel plates that constitutes one layer of the laminated yoke. With this arrangement, the outer circumferential surfaces of the direct drive shafts can be enclosed with a plurality of divided electromagnetic steel plate pieces by moving these divided pieces from radially outside toward the direct drive shafts. Thus, the laminated yoke can be fixed firmly to the yoke mounting portion even if the cross section of the yoke mounting portion of the direct drive shafts is made small.

If the electromagnetic steel plate is constructed of two divided electromagnetic steel plate pieces, they need to be shaped such that, when combined to enclose one or more direct drive shafts, the two divided pieces form an electromagnetic steel plate that constitutes one layer of the laminated yoke. In that case, it is preferred that two divided electromagnetic steel plate pieces are in the same shape. This arrangement requires only one kind of electromagnetic steel plate pieces to be prepared, making it possible to reduce the manufacturing cost of the laminated yoke.

The two divided electromagnetic steel plate pieces may each be provided with one or more engaging portions and one or more engaged portions. In that case, with the two divided electromagnetic steel plate pieces combined, the one or more engaging portions of one of the two divided electromagnetic steel plate pieces fit into the one or more engaged portions of the other of the two divided electromagnetic steel plate pieces and the one or more engaging portions of the second divided electromagnetic steel plate piece fit into the one or more engaged portions of the one of the two divided electromagnetic steel plate pieces. The engagement between the engaging portions and the engaged portions can prevent a relative movement of the two divided electromagnetic steel plate pieces. As a result, an assembly work of the laminated yoke is facilitated. Depending on the shape of the divided electromagnetic steel plate pieces, a plurality of the divided pieces may be laminated beforehand to form two divided laminated yokes. The two divided laminated yokes are then combined to hold one or more direct drive shafts in between to form a complete laminated yoke.

One or more direct drive shafts can be constructed of the first and second direct drive shafts arranged parallel with each other. With this arrangement, the direct drive shafts can be securely fitted to the laminate yoke.

It is also possible to use divided electromagnetic steel plate pieces which are so shaped that, when the two divided pieces are combined, the connecting portions of the two divided electromagnetic steel plate pieces incline at less than 45 degrees to an virtual line connecting the centers of the first and second direct drive shafts. When these divided electromagnetic steel plate pieces are used, the laminated yoke can be fixed easily to the yoke mounting portion of the direct drive shafts by adjusting two connecting portions of the two divided laminated yokes, which are constructed of a plurality of the divided electromagnetic steel plate pieces, and combining the two divided yokes together.

The one or more engaging portions and the one or more engaged portions may be formed at any desired locations. For example, these may be formed at the connecting portion. Or the one or more engaged portions are so arranged that the second shaft contact portion is situated between the one or more engaged portions and the connecting portion.

In the laminated yoke, the insertion member which is inserted into the laminate yoke may be arranged parallel to the one or more direct drive shafts. In that case too, each of the electromagnetic steel plates is preferably constructed of two divided electromagnetic steel plate pieces. The shapes of the two divided electromagnetic steel plate pieces are so determined, when combined to enclose the one or more direct drive shafts, to be able to form one of the electromagnetic steel plates that constitutes one layer of the laminated yoke and the two divided electromagnetic steel plate pieces also have an insertion hole in which to insert the insertion member. The insertion member is preferably shaped like a letter H at the cross section in the direction orthogonal to its center line extending parallel to axes of the direct drive shafts. With this arrangement, inserting the insertion member into the insertion hole can easily prevent the two divided electromagnetic steel plate pieces situated on both sides of the insertion member from parting from each other.

Further, the shape of the yoke mounting portion of the first and second direct drive shafts is not limited to a circle but may be a non-circular shape.

Still further, the other embodiment of the present invention concerns improvements on a movable assembly used in a cylinder type linear motor which has a linearly reciprocating movable core fixed to one or more direct drive shafts. In this invention, the movable core is constructed of a laminated yoke which has a plurality of electromagnetic steel plates laminated in the axial direction of the direct drive shafts. This laminated yoke structure made up of the electromagnetic steel plates provides an increased magnetic resistance to a path of magnetic flux. However, this laminated structure, in which a plurality of electromagnetic steel plates are laminated in the axial direction of the direct drive shafts, results in a significant reduction in the manufacture cost because a required number of electromagnetic steel plates of the same shape need only be laminated, as with a rotor core of a rotating machine. This invention is characterized in that magnetic member is arranged inside the laminated yoke to form a magnetic path extending through the laminated yoke in a direction of lamination and having a smaller magnetic resistance than that of the laminated yoke in the lamination direction. This arrangement can minimize an increase in the magnetic resistance of the movable core in the lamination direction. Thus, the use of the laminated yoke structure in which the electromagnetic steel plates are laminated in the axial direction does not degrade the magnetic characteristics of the movable core significantly when compared with those of the conventional cores. This invention therefore can provide a movable assembly for a cylinder type linear motor which can be manufactured at low cost without requiring a cutting process while preventing magnetic characteristic degradations.

The movable assembly for a cylinder type linear motor may be a movable core having excitation windings or a movable core having a plurality of permanent magnets arranged so that N pole and S pole alternate. The operation of the movable assembly is made simple if the movable core is rigidly attached with a plurality of permanent magnets.

The structure of the magnetic member is arbitrary. For example, if the direct drive shafts inserted into the laminated yoke are formed of magnetic members, it is possible, without adding new parts, to obtain an inexpensive movable assembly for a cylinder type linear motor that does not require a cutting process. Such a magnetic member may be formed of a magnetic material, such as carbon steel and pure iron.

The number and shape of the direct drive shafts are arbitrary. If the laminated yoke is non-circular at the cross section in the direction orthogonal to the direct drive shafts, two cylindrical direct drive shafts arranged parallel to each other are preferably used. These two cylindrical direct drive shafts are made of a material having a small magnetic resistance so that they constitute a magnetic member. This arrangement prevents the electromagnetic steel plates making up the laminated yoke from being rotated relative to the direct drive shafts and allows them to be easily positioned relative to the shafts, facilitating the manufacture of the movable assembly.

The magnetic member may be provided in the form of a cylindrical portion into which the direct drive shaft is inserted. With this arrangement, although the number of parts increases, the cylindrical portion can strengthen the laminated yoke. Further, by setting a desired shape of the outline of the cross section of the cylindrical portion, an appropriate rotation prevention and positioning of the electromagnetic steel plates relative to the cylindrical portion can be assured.

The cylindrical portion of the magnetic member is preferably integrally formed at one end with a flange portion that engages an end face of the laminated yoke in the lamination direction. The flange portion prevents the laminated yoke from directly abutting against a case of the cylinder type linear motor, thereby protecting the movable assembly against possible damages. The flange portion may also be formed with tapped holes extending therethrough in the direction of lamination and fastened with screws inserted from a side of the laminated yoke opposite the side abutting the flange portion, thereby connecting the magnetic member and the laminated yoke together firmly and easily.

The laminated yoke may have a square-columnar structure whose cross section in the direction orthogonal to the direct drive shaft is polygonal. The laminated yoke may also have on its outer circumference a plurality of permanent magnet mounting surfaces extending parallel to the direct drive shaft. In that case, it is preferred that the laminated yoke have formed therein a plurality of magnetic member receiving holes which correspond to the plurality of the permanent magnet mounting surfaces and that a plurality of divided magnetic bodies making up the magnetic member be fitted individually into the plurality of magnetic member receiving holes. With this arrangement, good magnetic paths can be formed, reducing the magnetic resistance of the movable core in the direction of lamination.

The laminated yoke may be formed with a groove in its outer circumferential surface that extends in the lamination direction and a position detection linear scale (a scale used to detect the position of the movable assembly relative to the stator) may be placed in this groove. This groove can be formed easily by properly setting the shape of the electromagnetic steel plates making up the laminated yoke. An angle base having a surface continuous to the groove is put on one end face, in the lamination direction, of the laminated yoke and the position detection linear scale is fixed to both the groove and the angle base. In this arrangement, the position detection linear scale can be set to a desired dimension by changing the size of the angle base.

The cylinder type linear motor using the movable assembly according to this invention has a cylinder type stator and a cylinder type movable assembly. The stator has a stator core and a plurality of excitation windings. The movable assembly has a movable core fixed to one or more direct drive shafts and a plurality of permanent magnets fixed to the movable core and is linearly moved. The movable core is constructed of a laminated yoke having a plurality of electromagnetic steel plates laminated in the axial direction of the direct drive shafts. In this laminated yoke is arranged a magnetic member that forms a magnetic path having a smaller magnetic resistance than that of the laminated yoke in the lamination direction and extending through the laminated yoke in the lamination direction. This arrangement can lower the manufacturing cost of the cylinder type linear motor when compared with the conventional motors.

This invention therefore can provide a movable assembly for a cylinder type linear motor that can be manufactured at low cost without requiring a cutting process while preventing magnetic characteristic degradations.

DETAILED DESCRIPTION OF PREFERRED EMBODIMENTS

Figure 1:
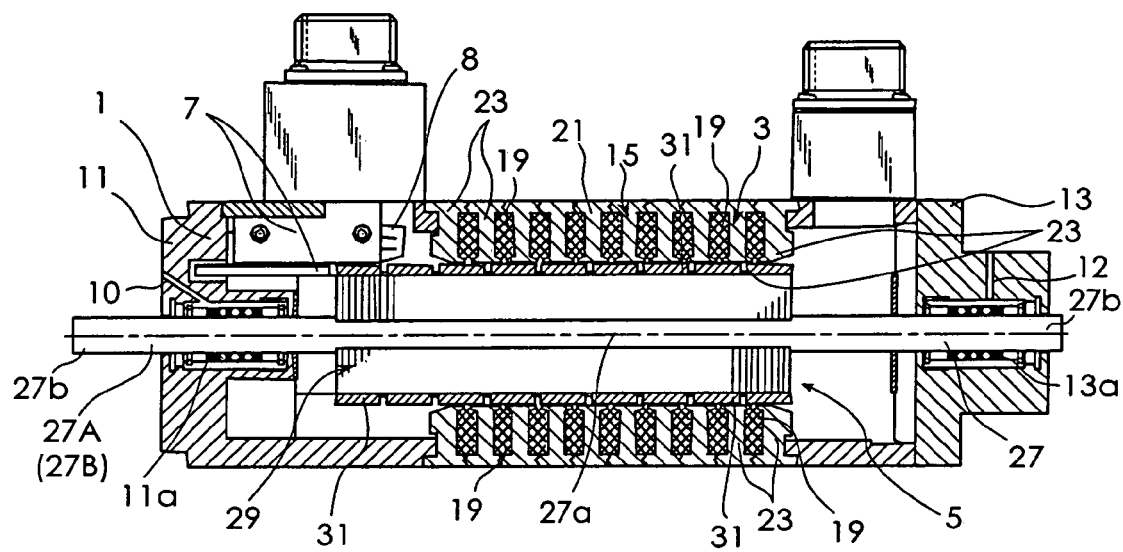
FIG. 1 is a cross-sectional view showing a cylinder type linear motor with a movable assembly of a construction which best embodies the present invention.

A preferred embodiment of this invention will be described by referring to the accompanying drawings. FIG. 1 is a cross-sectional view of a cylinder type linear motor with a movable assembly of one embodiment of this invention. As shown in FIG. 1, the cylinder type linear motor has a case 1, a stator 3, a movable assembly 5, and a linear sensor 7 to detect a position of the movable assembly 5. The case 1 has paired end brackets 11, 13 made of nonmagnetic material (e.g., aluminum). The end brackets 11, 13 are fixed to the ends of a stator core 15 of the stator 3 described later.

The stator 3 has the cylinder type stator core 15 and a plurality of excitation windings 19. The stator core 15 is situated between the end brackets 11, 13. The stator core 15 has a yoke 21 and a plurality of magnetic poles 23 arranged at predetermined intervals in an axial direction of the movable assembly 5. The construction of the stator core 15 is well known and thus its explanation is omitted here. In a slot formed between the two adjacent magnetic poles 23 of the stator core 15 a part of the excitation windings 19, formed of a winding conductor wound in a ring, is installed.

Figure 2:
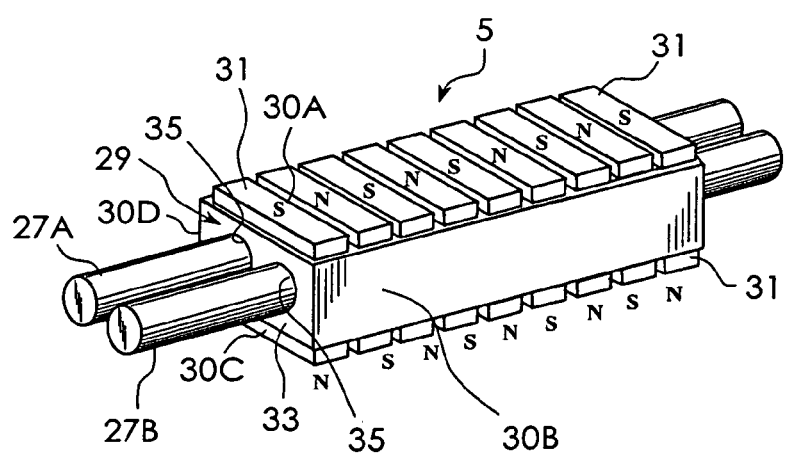
FIG. 2 is a perspective view of the movable assembly used in the cylinder type linear motor of FIG. 1.
Figure 3:
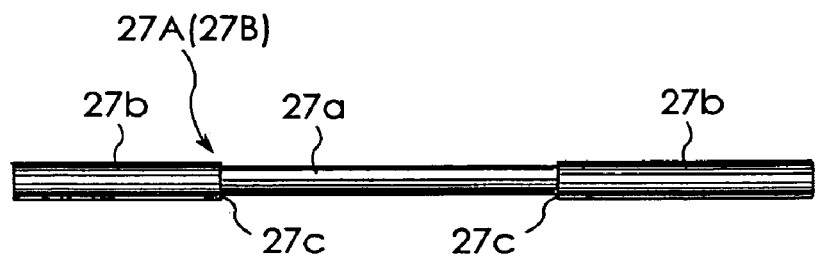
FIG. 3 is a plan view of a direct drive shaft used in the movable assembly of FIG. 2.

A linear sensor 7 having a hole sensor (a hole element) 8 can be used. In addition, grease-supplying paths 10, 12 through which grease can be supplied from outside to bearings 11a, 13a described below can be formed in paired end brackets 11, 13. As shown in a perspective view of FIG. 2, the movable assembly 5 comprises two first and second direct drive shafts 27A, 27B, a movable core 29 formed of a laminated yoke fixed to the direct drive shafts 27A, 27B, and a plurality of permanent magnets 31 fixed to the movable core 29. In FIG. 2 the direct drive shafts 27A, 27B are shown shorter than their actual lengths. The direct drive shafts 27A, 27B are arranged parallel to each other and have the same shapes and dimensions. As shown in FIG. 3, each of the direct drive shafts 27A, 27B has a yoke mounting portion 27a and paired supported portions 27b at both axial ends of the yoke mounting portion 27a. The yoke mounting portion 27a is cylindrically formed and fixed with the movable core. The paired supported portions 27b are formed in a cylindrical shape concentric with the yoke mounting portion 27a and, as shown in FIG. 1, are supported by bearings 11a, 13a in the paired end brackets 11, 13 so that they can perform a linear reciprocal motion. The yoke mounting portion 27a of each of the first and second direct drive shafts 27A, 27B has a smaller cross section taken along a lateral line perpendicular to the axial direction than that of the supported portions 27b. The first and second direct drive shafts 27A, 27B are formed of a magnetic member whose magnetic resistance is smaller than a magnetic resistance of the laminated yoke 29 in a direction of lamination and which forms a magnetic path extending through the laminated yoke 29 in the direction of lamination (simply referred to as a magnetic path forming member). More specifically, the direct drive shafts 27A, 27B (magnetic path forming member) are formed of carbon steel.

The laminated yoke 29 has a quadrangular prism structure whose cross section taken along a line perpendicular to the first and second direct drive shafts 27A, 27B is non-circular (in this example, rectangular). The laminated yoke 29 is formed by laminating a plurality of rectangular electromagnetic steel plates 33 in an axial direction of the first and second direct drive shafts 27A, 27B. As described later, a single, or a layer of, electromagnetic steel plate 33 is constructed of two divided electromagnetic steel plate pieces. The laminated yoke 29 is formed with two through-holes 35, 35 near the center through which the first and second direct drive shafts 27A, 27B are inserted. These two through-holes 35, 35 are arranged parallel to paired longer sides of the rectangular shape of the electromagnetic steel plates. Of outer circumferential surfaces 30A–30D of the laminated yoke 29, paired outer surfaces 30A, 30C extending parallel to the axial direction and opposing each other construct permanent magnet mounting surfaces on which a plurality of permanent magnets 31 are placed. The permanent magnets 31 are each shaped almost in a cuboid. The permanent magnets 31 are arranged to oppose the magnetic poles 23 of the stator 3, with their longitudinal direction set perpendicular to the axial direction of the first and second direct drive shafts 27A, 27B. In this example, the permanent magnets 31 are so arranged that any two adjacent permanent magnets 31 on the same surface of the laminated yoke 29 have different polarities on their outer surfaces and that any two opposing permanent magnets 31 on the top and bottom surfaces of the laminated yoke 29 that oppose each other through the laminated yoke 29 have different polarities on their outer surfaces.

Figure 4:
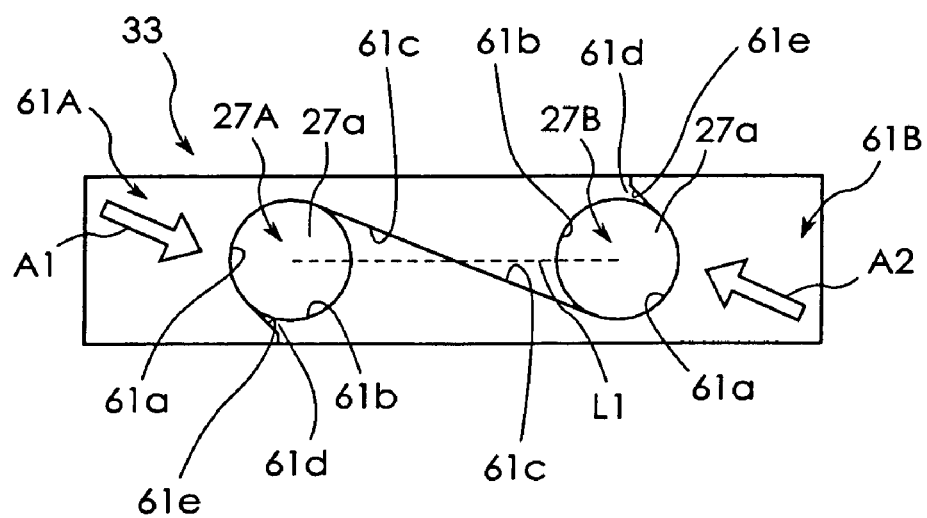
FIG. 4 is a plan view of an electromagnetic steel plate used in the movable assembly of FIG. 2.

As shown in FIG. 4, each of the electromagnetic steel plates 33 is constructed of first and second divided electromagnetic steel plate pieces 61A, 61B of the same shape. The shapes of the first and second divided electromagnetic steel plate pieces 61A, 61B are so determined that, when combined together to enclose the first and second direct drive shafts 27A, 27B, they can form the electromagnetic steel plate 33 that constitutes one of the layers of the laminated yoke 29. The first divided electromagnetic steel plate piece 61A has a contour including first and second shaft contact portions 61a, 61b, that are in contact with an outer circumferential surface of the yoke mounting portion 27a of the first direct drive shaft 27A and an outer circumferential surface of the yoke mounting portion 27a of the second direct drive shaft 27B respectively, and a connecting portion 61c connecting the first and second shaft contact portions 61a, 61b. The second divided electromagnetic steel plate piece 61B, as with the first divided electromagnetic steel plate piece 61A, also has a contour including first and second shaft contact portions 61a, 61b, which are in contact with an outer circumferential surface of the yoke mounting portion 27a of the second direct drive shaft 27B and an outer circumferential surface of the yoke mounting portion 27a of the first direct drive shaft 27A, and a connecting portion 61c connecting the first and second shaft contact portions 61a, 61b. The first and second divided electromagnetic steel plate pieces 61A, 61B are pushed in directions of arrows A1, A2, respectively. Now, the first and second direct drive shafts 27A, 27B are surrounded by the first divided electromagnetic steel plate piece 61A and the second divided electromagnetic steel plate piece 61B, with the first direct drive shaft 27A held between the first shaft contact portion 61a of the first electromagnetic steel plate piece 61A and the second shaft contact portion 61b of the second divided electromagnetic steel plate piece 61B and with the second direct drive shaft 27B held between the second shaft contact portion 61b of the first divided electromagnetic steel plate piece 61A and the first shaft contact portion 61a of the second divided electromagnetic steel plate piece 61B. In this state the connecting portion 61c of the first divided electromagnetic steel plate piece 61A abuts the connecting portion 61c of the second divided electromagnetic steel plate piece 61B. As described above, with the first and second divided electromagnetic steel plate pieces 61A, 61B put together, the connecting portions 61c of the first and second divided electromagnetic steel plate pieces 61A, 61B incline at less than 45 degrees to an virtual line L1 connecting the centers of the first and second direct drive shafts 27A, 27B.

Further, the first and second divided electromagnetic steel plate pieces 61A, 61B each has a contour including an engaging portion 61d and an engaged portion 61e. The engaging portion 61d is provided on one side of the connecting portion 61c where the first shaft contact portion 61a is situated. The engaged portion 61e is provided on the other side of the connecting portion 61c where the second shaft contact portion 61b is situated. With the first and second divided electromagnetic steel plate pieces 61A, 61B put together, the engaging portion 61d of the first divided electromagnetic steel plate piece 61A fits into the engaged portion 61e of the second divided electromagnetic steel plate piece 61B and the engaging portion 61d of the second divided electromagnetic steel plate piece 61B fits into the engaged portion 61e of the first divided electromagnetic steel plate piece 61A. This engagement structure prevents the combined state of the first and second divided electromagnetic steel plate pieces 61A, 61B from being disturbed easily.

In the movable assembly 5 of this example, the two direct drive shafts 27A, 27B each have a smaller magnetic resistance than that of the laminated yoke 29 in the direction of lamination and form a magnetic path completely extending through the laminated yoke 29 in the direction of lamination. This arrangement can reduce an increase in the magnetic resistance of the movable core in the lamination direction. As a result, if the movable core is constructed of the laminated yoke 29, which is formed by laminating the electromagnetic steel plates 33 in the axial direction, the magnetic characteristic of the movable core can be prevented from deteriorating significantly compared to those of the conventional movable core. Further, in the movable assembly 5 of this embodiment, since two direct drive shafts 27A, 27B are arranged parallel, a plurality of electromagnetic steel plates 33 can be precisely positioned with respect to the shafts 27A, 27B and also be prevented from rotating relative to the shafts 27A, 27B.

Further, in this example the first and second direct drive shafts 27A, 27B are so shaped that their yoke mounting portions 27a have smaller cross sections in the direction orthogonal to the axial direction than those of their supported portions 27b. This can reduce the cross section of the laminated yoke 29, making the laminated yoke more compactly and lighter than the conventional one. Since the outer circumferential surfaces of the first and second direct drive shafts 27A, 27B are enclosed by the first and second divided electromagnetic steel plate pieces 61A, 61B, the laminated yoke 29 can be fixed firmly to the yoke mounting portions 27a if the cross sections of the yoke mounting portions 27a of the first and second direct drive shafts 27A, 27B are made small. In this example, a plurality of the first divided electromagnetic steel plate pieces 61A are stacked and held together to form a first laminated yoke piece and a plurality of the second divided electromagnetic steel plate pieces 61B are laminated and held to form a second divided yoke piece. The first and second divided yoke pieces are combined to form the laminated yoke 29.

In a movable assembly for a cylinder type linear motor of this example, a plurality of permanent magnets 31 on one of the paired side surfaces are arranged in such a manner that polarity appearing on an outer surface of one of the permanent magnets 31 is different from that of the other permanent magnets adjacent to the one of the permanent magnets, and is also different from that of its opposing permanent magnet on the other side of the paired side surfaces. With this arrangement, magnetic fluxes flow between the opposing permanent magnets through the laminated yoke, which makes it difficult for the magnetic fluxes to flow in the direction of lamination of electromagnetic steel plates. Therefore the laminated yoke which hardly causes eddy current loss can be constructed by laminating the plurality of the electromagnetic steel plates in the axial direction of the direct drive shafts.

Figure 5:
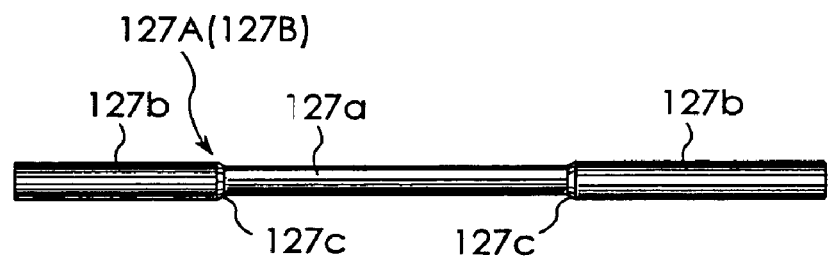
FIG. 5 is a plan view of a direct drive shaft of another example.

In the direct drive shafts (27A, 27B) shown in FIG. 3, step portions between the yoke mounting portion 27a and the pair of supported portions 27b are each formed by a ring-shaped surface 27c orthogonal to the axes of the shafts. The step portions between the yoke mounting portion 27a and the paired supported portions 27b can take a variety of forms. For example, in a direct drive shaft 127A(B) shown in FIG. 5, step portions between a yoke mounting portion 127a and paired supported portions 127b are formed by an inclining surface 127c that inclines away from the axis of the direct drive shaft 127A(B) from the yoke mounting portion 127a toward the paired supported portions 127b.

Figure 6:
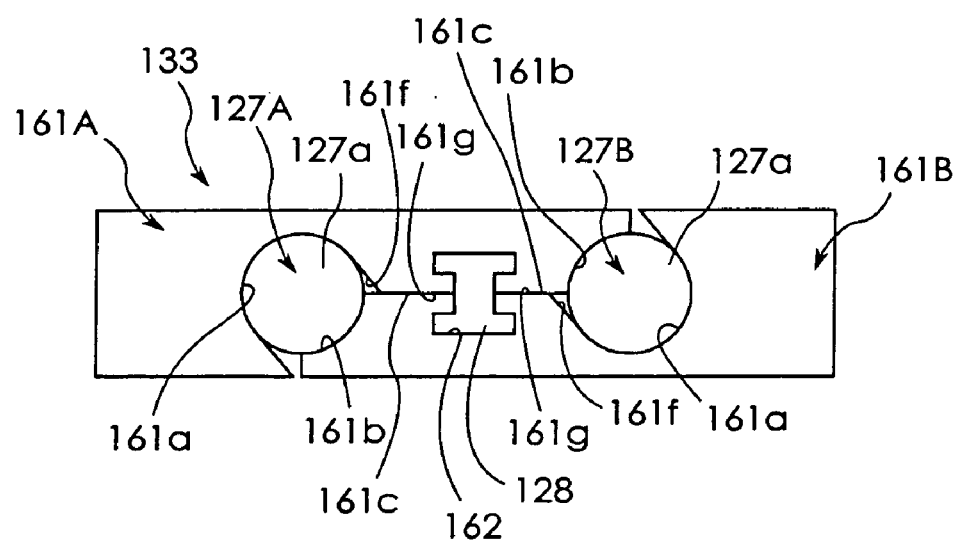
FIG. 6 is a plan view of an electromagnetic steel plate of another example.

The first and second divided electromagnetic steel plate pieces that together form a single electromagnetic steel plate can also take a variety of shapes. An electromagnetic steel plate 133 shown in FIG. 6 is also constructed of first and second divided electromagnetic steel plate pieces 161A, 161B in the same shape. A connecting portion 161c of the first divided electromagnetic steel plate piece 161A has a tangent portion 161f extending from an end of a first shaft contact portion 161a along a line tangent to a first direct drive shaft 127A and an abutment portion 161g extending along a line connecting the centers of the first and second direct drive shafts 127A, 127B. A connecting portion 161c of the second divided electromagnetic steel plate piece 161B similarly has a tangent portion 161f extending from an end of the first shaft contact portion 161a along a line tangent to the second direct drive shaft 127B and an abutment portion 161g extending along a line connecting the centers of the first and second direct drive shafts 127A, 127B. With the first and second divided electromagnetic steel plate pieces 161A, 161B put together to enclose the first and second direct drive shafts 127A, 127B, the abutment portion 161g of the first divided electromagnetic steel plate piece 161A abuts the engagement portion 161g of the second divided electromagnetic steel plate piece 161B.

Further, in this example, the first and second divided electromagnetic steel plate pieces 161A, 161B are so shaped that, when combined together to enclose the first and second direct drive shafts 127A, 127B, the steel plate pieces 161A, 161B are each formed with an insertion hole 162 at the abutment portion 161g. In this insertion hole 162 an insertion member 128 is inserted parallel to the first and second direct drive shafts 127A, 127B. The insertion member 128 is shaped like a letter H in a cross section orthogonal to the axes of the first and second direct drive shafts 127A, 127B. The use of the electromagnetic steel plate 133 of this example can keep the combined state of the first and second divided electromagnetic steel plate pieces 161A, 161B by the insertion member 128, so there is no need for these steel plate pieces to have the engaging portion and the engaged portion at their periphery.

Figure 7:
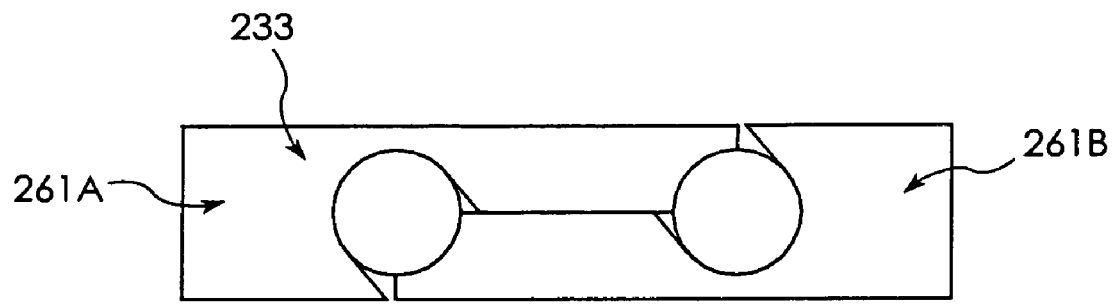
FIG. 7 is a plan view of an electromagnetic steel plate of still another example.

An electromagnetic steel plate 233 shown in FIG. 7 is constructed of first and second divided electromagnetic steel plate pieces 261A, 261B in the same shape. The electromagnetic steel plate 233 of this example is similar in construction to the electromagnetic steel plate 133 of FIG. 6, except that it has no insertion hole.

Figure 8:
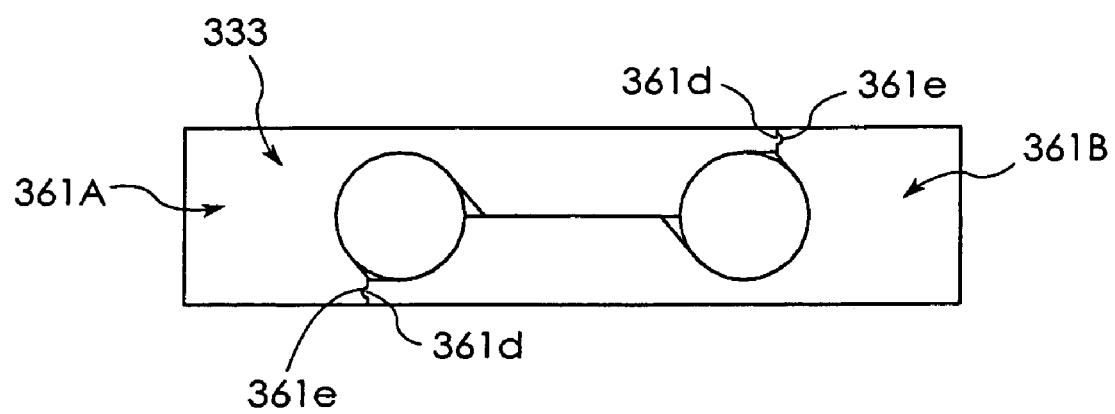
FIG. 8 is a plan view of an electromagnetic steel plate of yet another example.

An electromagnetic steel plate 333 shown in FIG. 8 is constructed of first and second divided electromagnetic steel plate pieces 361A, 361B in the same shape. The first and second electromagnetic steel plate pieces 361A, 361B each have an engaging portion 361d and an engaged portion 361e at their contour. The engaging portion 361d of the first divided electromagnetic steel plate piece 361A is provided in the form of a projection protruding toward the second divided electromagnetic steel plate piece 361B. The engaging portion 361d of the second divided electromagnetic steel plate piece 361B is provided in the form of a projection protruding toward the first divided electromagnetic steel plate piece 361A. The engaged portion 361e of the first divided electromagnetic steel plate piece 361A is recessed relative to the second divided electromagnetic steel plate piece 361B and provided in the form of a recess into which the engaging portion 361*d* of the second divided electromagnetic steel plate piece 361B is fitted. The engaged portion 361*e* of the second divided electromagnetic steel plate piece 361B is recessed relative to the first divided electromagnetic steel plate piece 361A and is provided in the form of a recess into which the engaging portion 361*d* of the first divided electromagnetic steel plate piece 361A is fitted.

Figure 9:
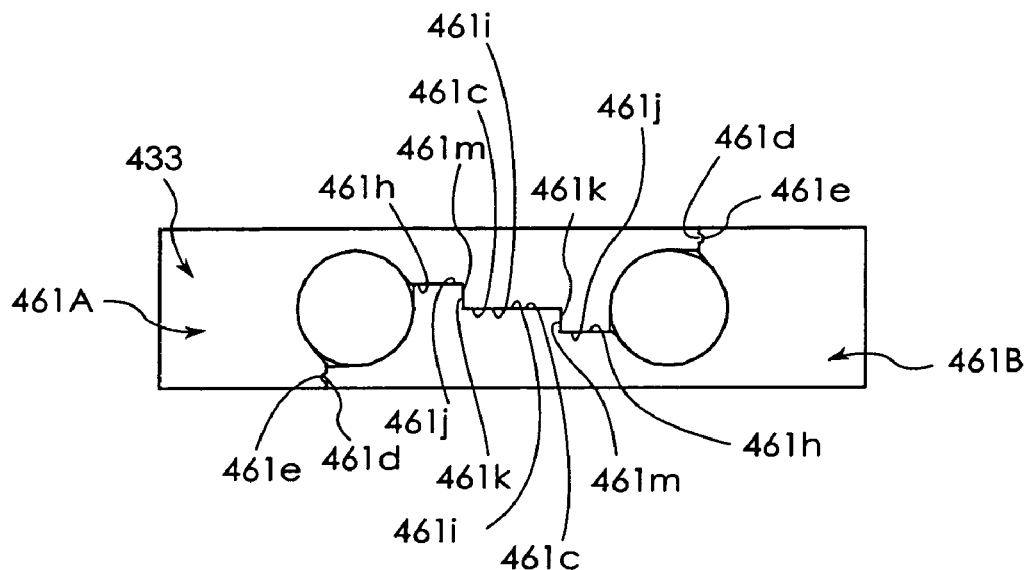
FIG. 9 is a plan view of an electromagnetic steel plate of a further example.

An electromagnetic steel plate 433 shown in FIG. 9 is constructed of first and second divided electromagnetic steel plate pieces 461A, 461B in the same shape. The first and second divided electromagnetic steel plate pieces 461A, 461B each have a contour including an engaging portion 461*d* and an engaged portion 461*e*, as with the electromagnetic steel plate 333 in FIG. 8.

A connecting portion 461*c* of the first and second divided electromagnetic steel plate pieces 461A, 461B has three linear portions 461*h*–461*j* extending between the first direct drive shaft 27A and the second direct drive shaft 27B, a linear portion 461*k* extending in a direction orthogonal to the linear portions 461*h*–461*j* and connecting the linear portion 461*h* and the linear portion 461*i*, and a linear portion 461*m* extending in a direction orthogonal to the linear portions 461*h*–461*j* and connecting the linear portion 461*i* and the linear portion 461*j*. The linear portion 461*h* of the first divided electromagnetic steel plate piece 461A abuts the linear portion 461*i* of the second divided electromagnetic steel plate piece 461B; the linear portion 461*i* of the first divided electromagnetic steel plate piece 461A abuts the linear portion 461*i* of the second divided electromagnetic steel plate piece 461B; the linear portion 461*j* of the first divided electromagnetic steel plate piece 461A abuts the linear portion 461*h* of the second divided electromagnetic steel plate piece 461B; the linear portion 461*k* of the first divided electromagnetic steel plate piece 461A abuts the linear portion 461*m* of the second divided electromagnetic steel plate piece 461B; and the linear portion 461*m* of the first divided electromagnetic steel plate piece 461A abuts the linear portion 461*k* of the second divided electromagnetic steel plate piece 461B. In this construction, the connecting portions 461*c* of the first and second divided electromagnetic steel plate pieces 461A, 461B form engaging step portions through which the first divided electromagnetic steel plate piece 461A and the second divided electromagnetic steel plate piece 461B are firmly connected.

Figure 10:
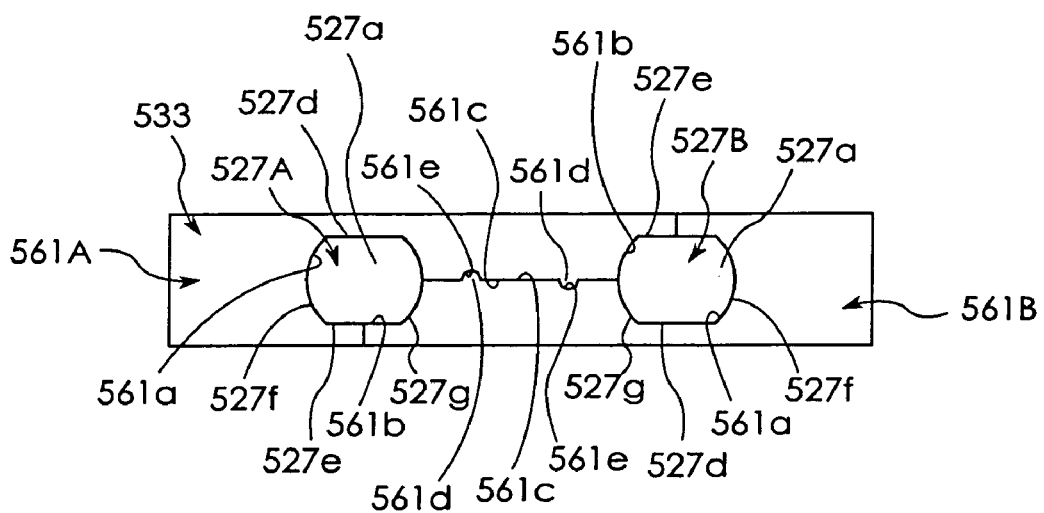
FIG. 10 is a plan view of an electromagnetic steel plate of a further example.

An electromagnetic steel plate 533 shown in FIG. 10 is constructed of first and second divided electromagnetic steel plate pieces 561A, 561B in the same shape. In this example, yoke mounting portions 527*a* of the first and second direct drive shafts 527A, 527B are formed in a shape similar to a rectangle or in a noncircular shape at cross section. More specifically, the cross section of the yoke mounting portions 527*a* has two parallel sides 527*d*, 527*e* and two curved sides 527*f*, 527*g*, which are outwardly convex and connect ends of the parallel sides 527*d*, 527*e*. A first shaft contact portion 561*a* at the contour of the first divided electromagnetic steel plate piece 561A abuts the side 527*d*, a half of the side 527*e*, the curved side 527*f* and a half of the curved side 527*g* of the first direct drive shaft 527A. A second shaft contact portion 561*b* at the contour of the first divided electromagnetic steel plate piece 561A abuts a half of the side 527*e* and a half of the curved side 527*g* of the second direct drive shaft 527B. A first shaft contact portion 561*a* at the periphery of the second divided electromagnetic steel plate piece 561B abuts the side 527*d*, a half of the side 527*e*, the curved side 527*f* and a half of the curved side 527*g* of the second direct drive shaft 527B. A second shaft contact portion 561*b* at the periphery of the second divided electromagnetic steel plate piece 561B abuts a half of the side 527*e* and a half of the curved side 527*g* of the first direct drive shaft 527A.

A connecting portion 561*c* of each of the first and second divided electromagnetic steel plate pieces 561A, 561B extend along a line connecting the centers of the first and second direct drive shafts 527A, 527B. In this example, each of the connecting portions 561*c* has a contour including an engaging portion 561*d* and an engaged portion 561*e*. The engaging portion 561*d* of the first divided electromagnetic steel plate piece 561A is formed of a projection protruding toward the second divided electromagnetic steel plate piece 561B and the engaging portion 561*d* of the second divided electromagnetic steel plate piece 561B is formed of a projection protruding toward the first divided electromagnetic steel plate piece 561A. The engaged portion 561*e* of the first divided electromagnetic steel plate piece 561A is recessed relative to the second divided electromagnetic steel plate piece 561B and provided in the form of a recess into which the engaging portion 561*d* of the second divided electromagnetic steel plate piece 561B is fitted. The engaged portion 561*e* of the second divided electromagnetic steel plate piece 561B is recessed relative to the first divided electromagnetic steel plate piece 561A and provided in the form of a recess into which the engaging portion 561*d* of the first divided electromagnetic steel plate piece 561A is fitted.

The movable assembly can adopt a variety of constructions. A laminated yoke 629 of a movable assembly 605 in FIG. 11 has a quadrangular square-columnar structure whose cross section in to the direction orthogonal to the direct drive shafts 627A, 627B in the laminated yoke 629 is almost square. A plurality of square electromagnetic steel plates 633 are laminated in an axial direction of the direct drive shafts 627A, 627B to form the laminated yoke 629. The laminated yoke 629 has on its outer circumference four rectangular permanent magnet mounting surfaces 630A–630D extending parallel to the direct drive shafts 627A, 627B on which a plurality of permanent magnets 631 are mounted. In this example, any four circumferentially aligned permanent magnets 631 mounted one on each of the four permanent magnet mounting surfaces 630A–630D are so arranged that they have the same polarities on their outer surfaces.

Figure 12:
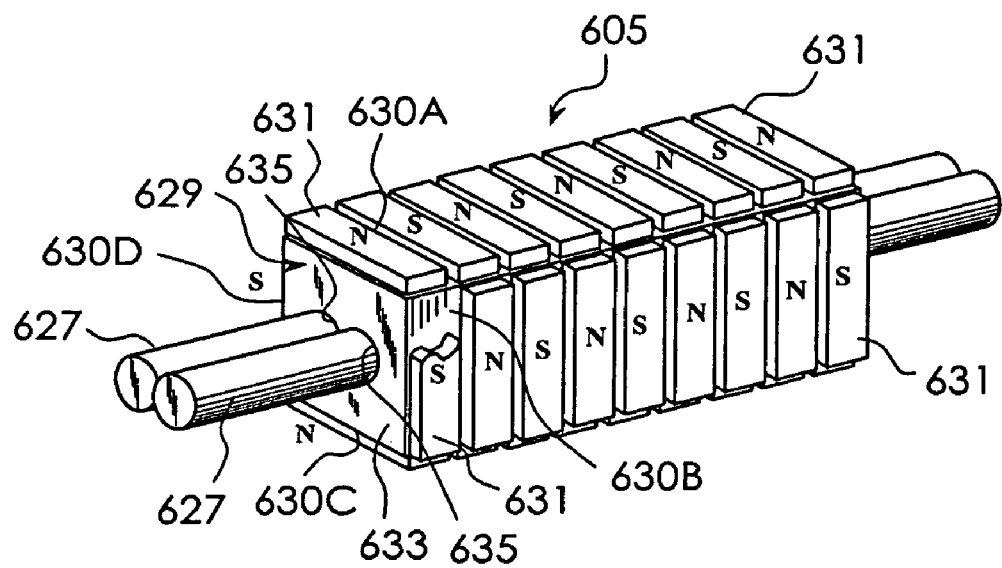
FIG. 12 is a perspective view of a movable assembly of still another example.

As shown in FIG. 12, the four circumferentially aligned permanent magnets 631 mounted one on each of the four permanent magnet mounting surfaces 630A–630D may be arranged so that their polarity on their outer surface changes alternately.

Figure 13:
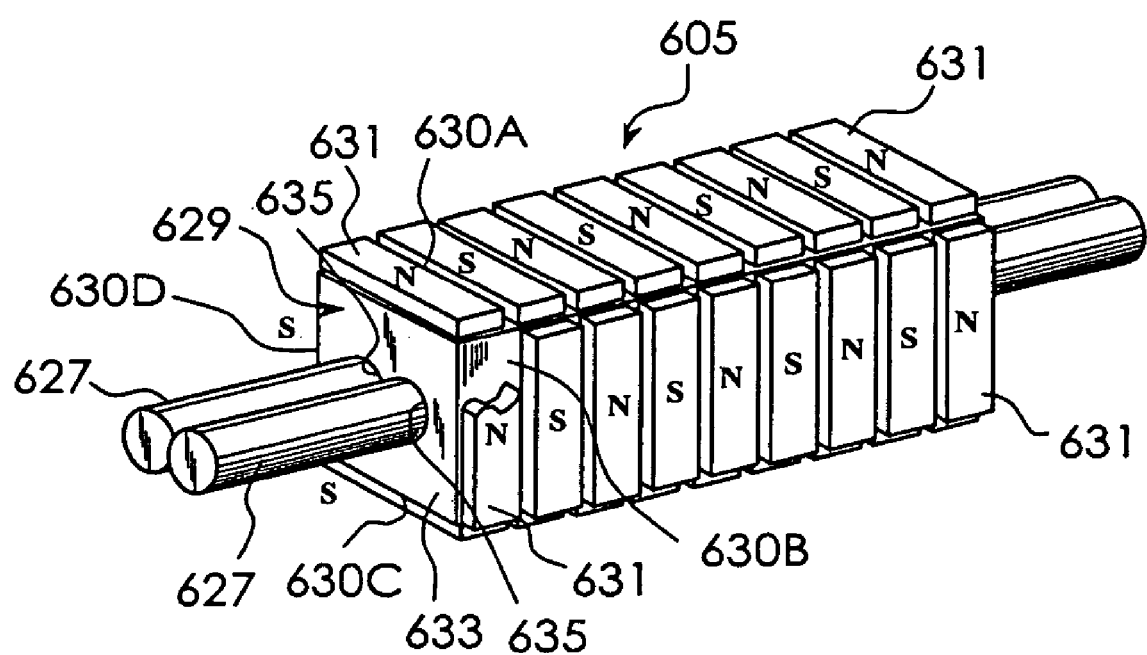
FIG. 13 is a perspective view of a movable assembly of yet another example.

Further, as shown in FIG. 13, on the four permanent magnet mounting surfaces 630A–630D, the plurality of permanent magnets 631 thereon are juxtaposed in the axial direction of the direct drive shafts 627 in such a manner that polarity, N or S, appears alternatively in the axial direction. The polarity pattern of the permanent magnets 631 on the permanent magnet mounting surface 630A is the same as the polarity pattern of the permanent magnets 631 on the permanent magnet mounting surface 630B. The polarity pattern of permanent magnet 631 on the permanent magnet mounting surface 630C is the same as the polarity pattern of the permanent magnets 631 on the permanent magnet mounting surface 630D. The polarity pattern of the permanent magnets 631 on the permanent magnet mounting surfaces 630A, 630B is the opposite pattern from that on the permanent magnet mounting surfaces 630C, 630D. In other words, the polarity appearing on an outer surface of one of the permanent magnets on one of the paired side surface is different from that of the opposing permanent magnets on the other of the paired side surfaces.

Figure 14A:
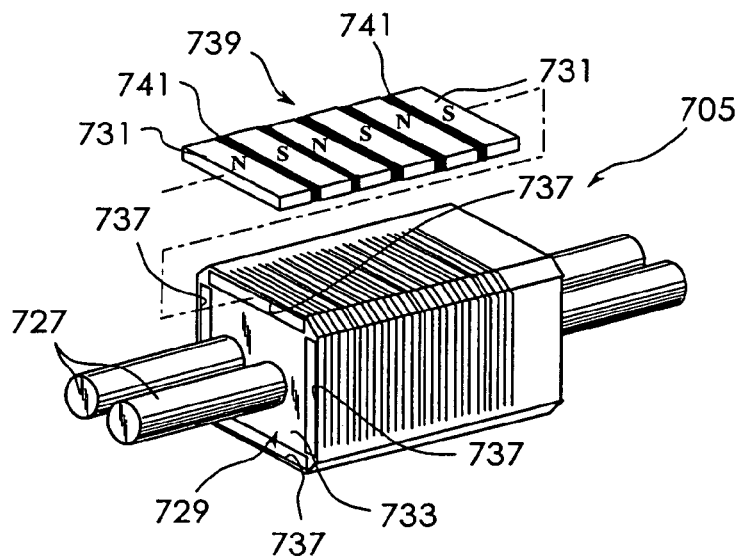
FIG. 14(a) is a perspective view of a movable assembly of a further example.

A laminated yoke 729 of a movable assembly 705 shown in FIG. 14(a) is constructed of a plurality of electromagnetic steel plates 733, each of which is formed with four through-holes. These through-holes constitute four permanent magnet receiving holes 737 formed in the laminated yoke 729. The four permanent magnet receiving holes 737 are formed at peripheral portions of the laminated yoke 729 along its circumferential surface. Each of the four permanent magnet receiving holes 737 receives a plate-like permanent magnet group 739. The permanent magnet group 739 comprises a plurality of permanent magnets 731 arranged so that their polarity on the outer surface alternates. They are arranged parallel to each other and joined together, with a spacer 741 of nonmagnetic material interposed between the adjacent permanent magnets.

Figure 14B:
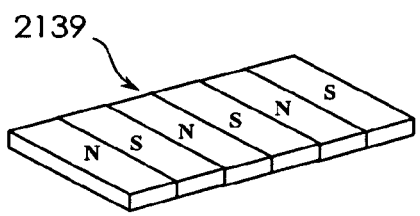
FIGS. 14(b)–14(d) are perspective views of variations of a permanent magnet group used in FIG. 14(a).
Figure 14C:
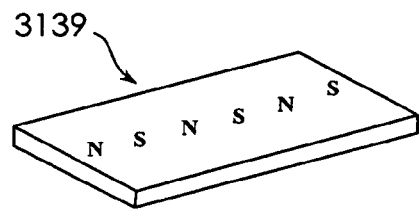
Figure 14D:
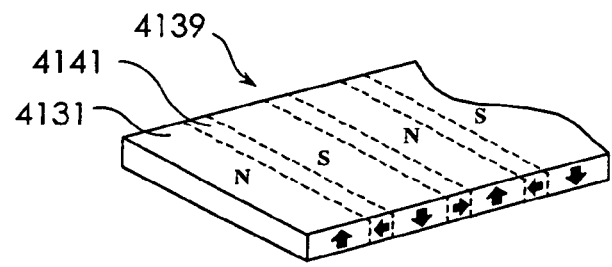

FIGS. 14(b) to 14(d) show permanent magnet groups whose constructions differ from that of the permanent magnet group of the movable assembly shown in FIG. 14(a). A permanent magnet group 2139 of FIG. 14(b) uses no spacer and, in other respects, has the similar construction to that of the permanent magnet group 739 of FIG. 14(a). A permanent magnet group 3139 shown in FIG. 14(c) has an integrally formed plate of magnetic material magnetized so that N pole and S pole appear alternately on its surface. A permanent magnet group 4139 shown in FIG. 14(d) has an integrally formed plate of magnetic material magnetized so that a plurality of permanent magnet portions 4131 and spacer portions 4141 are alternated. The spacer portions 4141 are magnetized so that their magnetization direction is rotated 90 degrees from those of the adjacent permanent magnet portions 4131 to form a magnetic path along the polarities of the adjacent permanent magnet portions 4131. That is, the permanent magnet group 4139 is constructed in a so-called Halbach magnet array. The permanent magnet group 4139 may be pre-magnetized before being fixed to the laminated yoke or may be formed by one fixing a permanent magnetic material to the laminated yoke and then magnetizing it.

Figure 15:
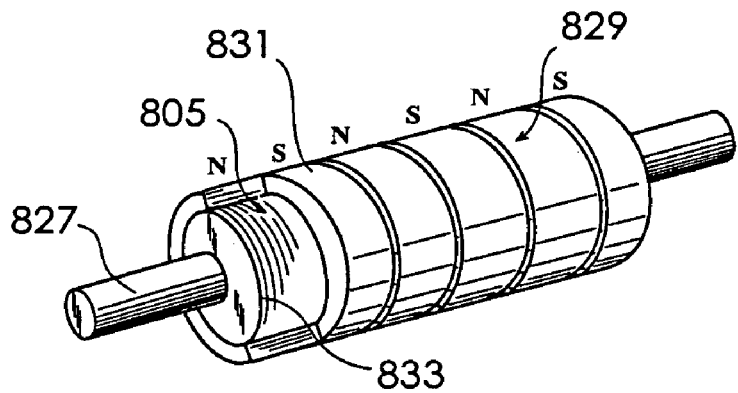
FIG. 15 is a perspective view of a movable assembly of a further example.

A movable assembly 805 shown in FIG. 15 has a single direct drive shaft 827. The movable assembly 805 of this example, as with the one shown in FIG. 11, also has the direct drive shaft 827 constructed of a magnetic path forming material. In this movable assembly 805, electromagnetic steel plates 833 are each shaped like a circular plate so that a laminated yoke 829 is constructed in a shape of a circular column.

Figure 16:
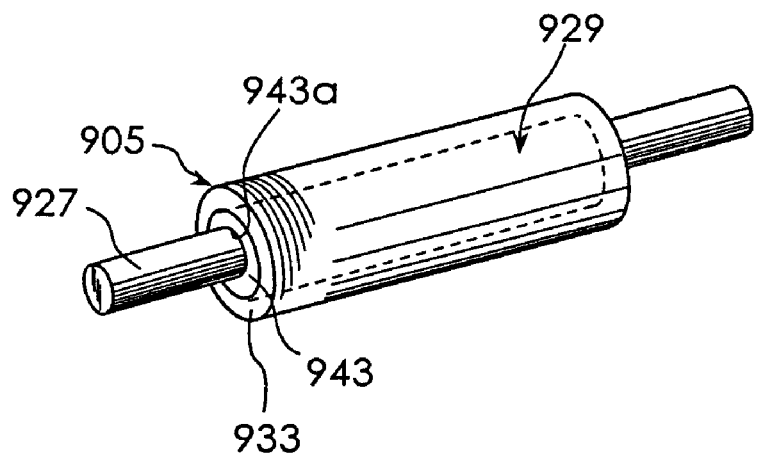
FIG. 16 is a perspective view of a movable assembly of another example.

A movable assembly 905 shown in FIG. 16 has one direct drive shaft 927. To reduce a leakage flux passing through the direct drive shaft 927, the shaft is formed of a nonmagnetic or weak magnetic SUS material. A laminated yoke 929 is cylindrically formed. Though not shown in FIG. 16, the laminated yoke 929 has a plurality of annular permanent magnets fixed thereto. The laminated yoke 929 is constructed of a plurality of ring-shaped electromagnetic steel plates 933 laminated. In this example, a cylindrical portion 943 of a magnetic path forming material is arranged between the laminated yoke 929 and the direct drive shaft 927. The cylindrical portion 943 is formed in an elongate cylindrical shape and receives the direct drive shaft 927 through its center hole 943a. In the movable assembly 905 of this example, the cylindrical portion 943 has a magnetic resistance smaller than that of the laminated yoke 929 in the lamination direction and forms a magnetic path extending through the laminated yoke 929 in the lamination direction. Further, the cylindrical portion 943 can increase the strength of the laminated yoke 929.

Figure 17A:
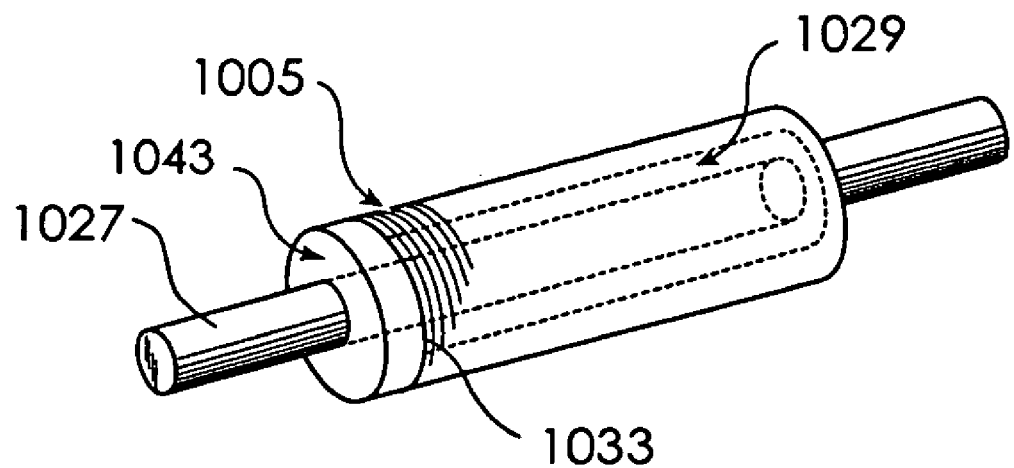
FIG. 17(a) is a perspective view of a movable assembly of another example.
Figure 17B:
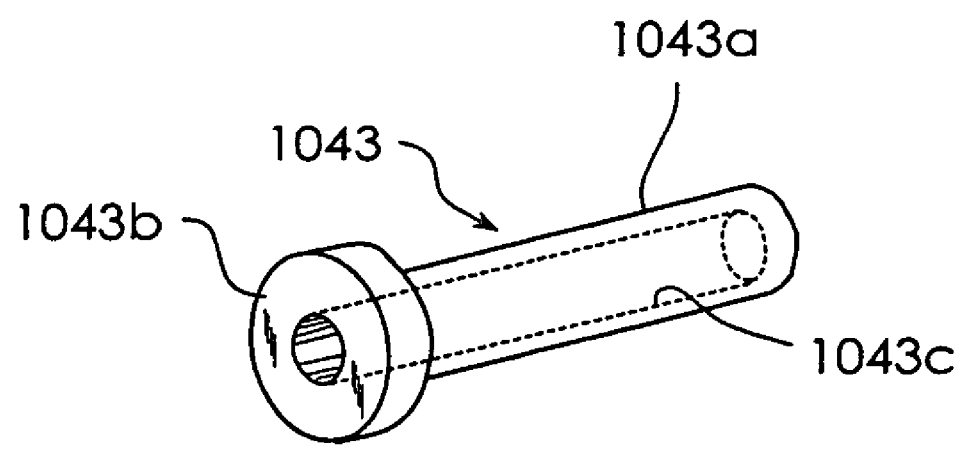
FIG. 17(b) is a perspective view of a cylindrical structure used in FIG. 17(a).

A movable assembly 1005 shown in FIG. 17(a) has one direct drive shaft 1027. To reduce a leakage flux passing through the direct drive shaft, the shaft is formed of a nonmagnetic or weak magnetic SUS material. A laminated yoke 1029 is cylindrically formed. Though not shown in this example, the laminated yoke 1029 also has a plurality of annular permanent magnets fixed thereto. The laminated yoke 1029 is constructed of a plurality of ring-shaped electromagnetic steel plates 1033 laminated. In this example, a cylindrical structure 1043 made of a magnetic path forming material is arranged between the laminated yoke 1029 and the direct drive shaft 1027. The cylindrical structure 1043, as shown in FIG. 17(b), has a cylindrical portion 1043a and a flange portion 1043b. The cylindrical portion 1043a is shaped like an elongate cylinder. The flange portion 1043b is formed like a short cylinder, shorter in length and larger in diameter than the cylindrical portion 1043a, and is provided at one end of the cylindrical portion 1043a. The direct drive shaft 1027 extends through a center hole 1043c of the cylindrical portion 1043a and the flange portion 1043b. Thus, the flange portion 1043b abuts one end face of the laminated yoke 1029 in the lamination direction. In the movable assembly 1005 of this example, the cylindrical structure 1043 has a smaller magnetic resistance than that of the laminated yoke 1029 in the lamination direction and forms a magnetic path extending through the laminated yoke 1029 in the lamination direction. Further, the flange portion 1043b prevents the laminated yoke 1029 from directly contacting a case of a cylinder type linear motor, thereby protecting the movable assembly 1005 against possible damages.

Figure 18:
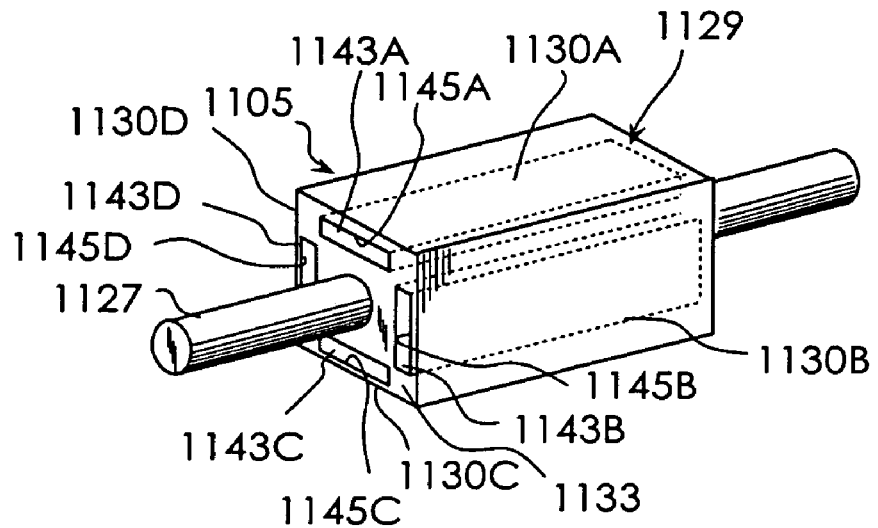
FIG. 18 is a perspective view of a movable assembly of a further example.

A movable assembly 1105 shown in FIG. 18 has one direct drive shaft 1127. To reduce a leakage flux passing through the direct drive shaft, the shaft is formed of a nonmagnetic or weak magnetic SUS material. A laminated yoke 1129 is shaped in a square column. Though not shown in this example, the laminated yoke 1129 also has a plurality of permanent magnets arranged on four permanent magnet mounting surfaces 1130A–1130D. The laminated yoke 1129 is constructed of a plurality of almost square electromagnetic steel plates 1133 laminated. In this example, the laminated yoke 1129 is formed therein with four magnet receiving holes 1145A–1145D extending along the direct drive shaft 1127 which correspond to the four permanent magnet mounting surfaces 1130A–1130D. The four magnet receiving holes 1145A–1145D form rectangular prism-structured inner spaces in which plate-like divided magnets 1143A–1143D made of a magnetic path forming material are fitted. In the movable assembly 1105 of this example, the divided magnets 1143A–1143D form a magnetic path extending in the lamination direction of the laminated yoke 1129 and which has a smaller magnetic resistance than that of the laminated yoke 1129 in the lamination direction. Further, the plate-like divided magnets 1143A–1143D can enhance the positioning precision of the electromagnetic steel plates 1133 relative to the direct drive shaft 1127 and also increase their mechanical strength.

Figure 11:
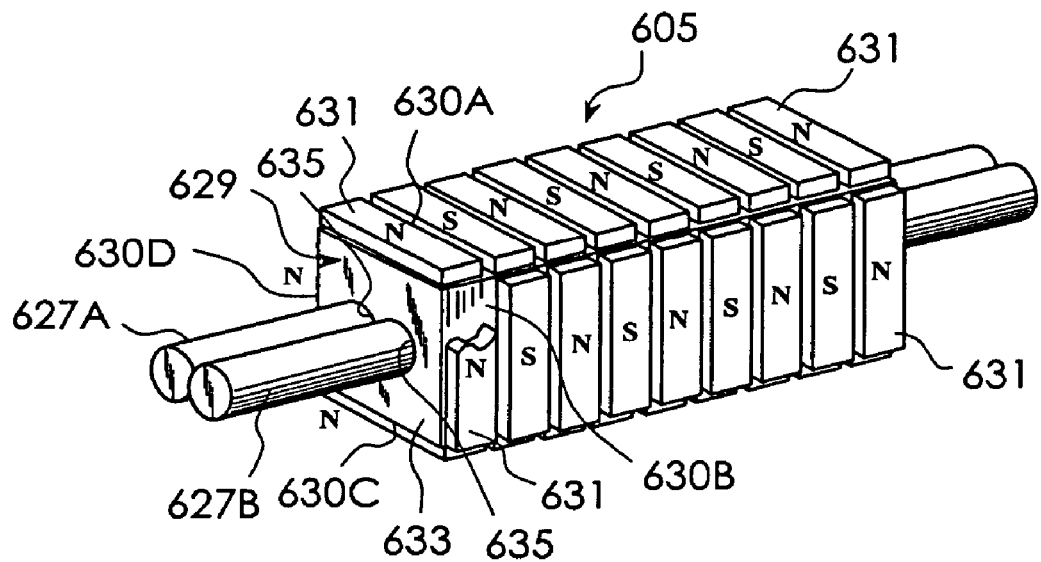
FIG. 11 is a perspective view of a movable assembly of another example.
Figure 19:
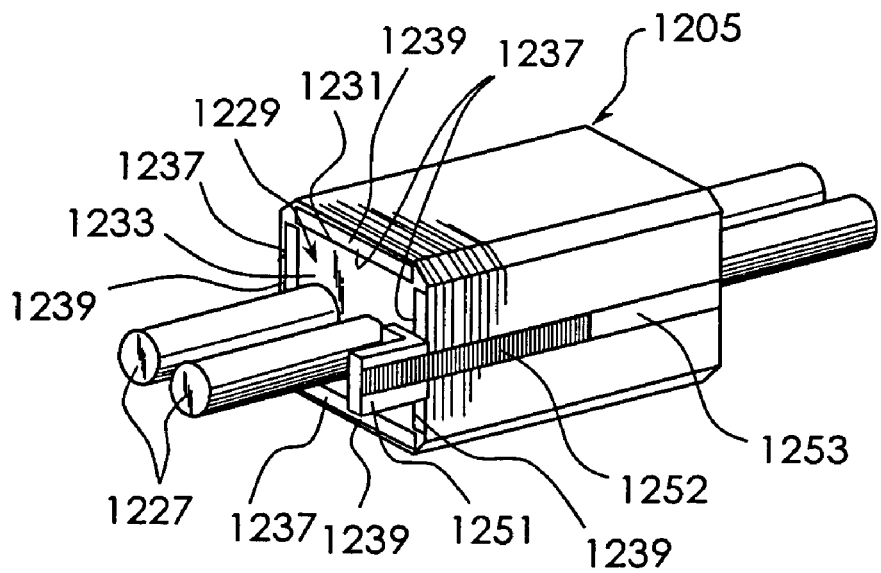
FIG. 19 is a perspective view of a movable assembly of a further example.

A movable assembly 1205 shown in FIG. 19, as with the movable assembly 605 of FIG. 11, has two direct drive shafts 1227 formed of a magnetic path forming material. A laminated yoke 1229 of this movable assembly 1205 is constructed of a plurality of electromagnetic steel plates 1233, each of which has four through-holes. These through-holes form four permanent magnet receiving holes 1237 in the laminated yoke 1229. The four permanent magnet receiving holes 1237 are formed in a peripheral portions of the laminated yoke 1229 along its outer circumferential surface. In these four permanent magnet receiving holes 1237 are fitted plate-like permanent magnet groups 1239, each of which has a plurality of permanent magnets 1231 arranged parallel to each other and joined so that a magnetic polarity on their outer surface alternates between N and S poles.

The laminated yoke 1229 has an angle base 1251 fixed to one end face, in the lamination direction, of the laminated yoke 1229. One of the outer circumferential surfaces of the laminated yoke is formed with a groove 1253 that extends in the lamination direction of the electromagnetic steel plates 1233. A position detection linear scale 1252 is fixed to both the groove 1253 and the angle base 1251. The position detection linear scale 1252 is an elongate metal strip used to detect a position of the movable assembly with respect to the stator and formed with a number of parallel notches extending in a direction orthogonal to the longitudinal direction of the metal strip. An optical reader mounted on the stator reads the scale to determine the position of the movable assembly. The groove 1253 is about 0.2 mm deep and has almost no effect on a thrusting force. Since the groove 1253 is formed at the same time that the electromagnetic steel plates 1233 are stamped, the movable assembly can be manufactured at low cost, with enhanced mechanical precision. This arrangement can also enhance the precision of the position at which the position detection linear scale 1252 is fixed.

Figure 20:
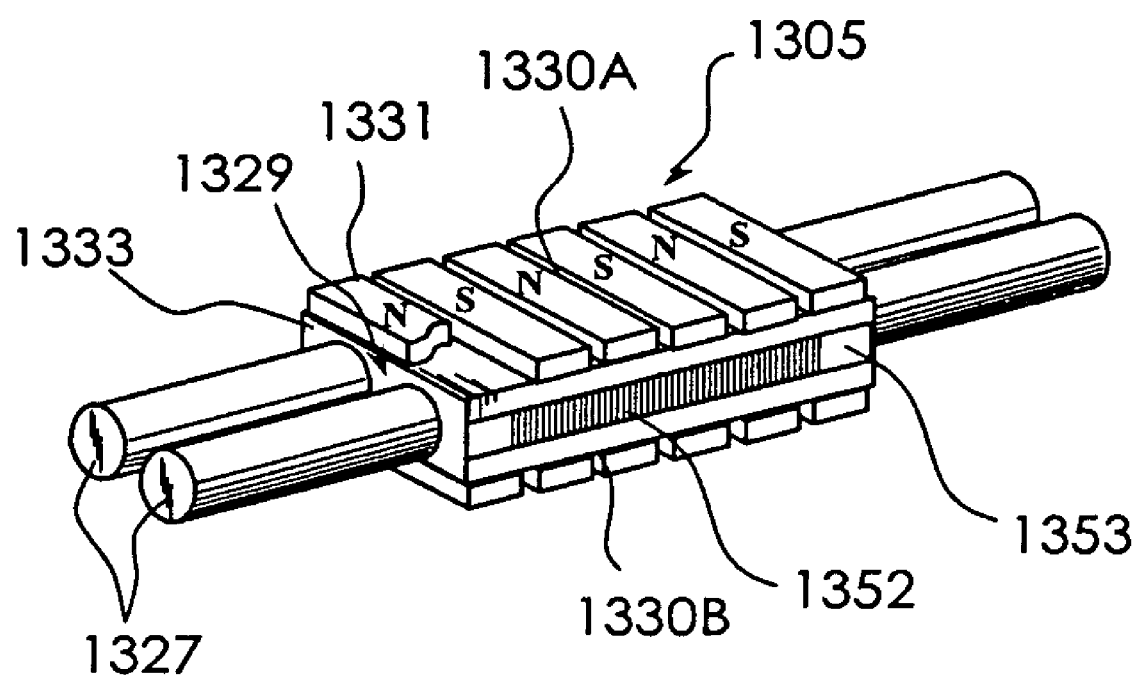
FIG. 20 is a perspective view of a movable assembly of a further example.

A movable assembly 1305 shown in FIG. 20, as with the movable assembly 605 of FIG. 11, has two direct drive shafts 1227 formed of a magnetic path forming material. A laminated yoke 1329 of this movable assembly 1305 is constructed of a plurality of electromagnetic steel plates 1333, each of which has two permanent magnet mounting surfaces 1330A, 1330B on which permanent magnets 1331 are fixed. On the surfaces of the laminated yoke 1329 on which the permanent magnets 1331 are not mounted, a groove 1353 extending in the lamination direction of the electromagnetic steel plates 1333 is formed. The groove 1353 is rigidly attached with a position detection linear scale 1352. This construction enables the linear scale to be fixed with high precision without increasing the number of parts and makes for a reduction in space.

Further, the present invention is not limited to these embodiments, but variations and modifications may be made without departing from the scope of the present invention.

What is claimed is:

1. A movable assembly for a cylinder type linear motor, the cylinder type linear motor having a movable core fixed to one or more direct drive shafts and capable of performing a reciprocal, linear motion;
    wherein the one or more direct drive shafts each have a yoke mounting portion to which the movable core is fixed and a pair of supported portions situated at both axial ends of the yoke mounting portion and supported by bearings;
    wherein the direct drive shafts are so shaped that the yoke mounting portion has a smaller cross section orthogonal to the axial direction than that of the supported portions;
    wherein the movable core is constructed of a laminated yoke which is formed of a plurality of electromagnetic steel plates laminated in an axial direction of the direct drive shafts;
    wherein the electromagnetic steel plates are each constructed of a plurality of divided electromagnetic steel plate pieces;
    wherein the divided electromagnetic steel plate pieces are so shaped, when combined to enclose the one or more direct drive shafts, as to be able to form one of the electromagnetic steel plates that constitutes one layer of the laminated yoke;
    wherein the one or more direct drive shafts are first and second direct drive shafts arranged parallel to each other; and,
    wherein the divided electromagnetic steel plate pieces are in the same shape.

2. The movable assembly for a cylinder type linear motor according to claim 1, wherein the electromagnetic steel plates are each constructed of two divided electromagnetic steel plate pieces; and
    wherein the two divided electromagnetic steel plate pieces are so shaped, when combined to enclose the direct drive shafts, as to be able to form one of the electromagnetic steel plates that constitutes one layer of the laminated yoke.

3. The movable assembly for a cylinder type linear motor according to claim 1, wherein the electromagnetic steel plates are each constructed of two divided electromagnetic steel plate pieces;
    wherein the two divided electromagnetic steel plate pieces are so shaped that, when combined to enclose the direct drive shafts, they form one of the electromagnetic steel plates that constitutes one layer of the laminated yoke;
    wherein the two divided electromagnetic steel plate pieces are of the same shape.

4. The movable assembly for a cylinder type linear motor according to claim 1, wherein the electromagnetic steel plates are each constructed of two divided electromagnetic steel plate pieces;
    wherein the two divided electromagnetic steel plate pieces are so shaped that, when combined to enclose the direct drive shafts, they form one of the electromagnetic steel plates that constitutes one layer of the laminated yoke;
    wherein the two divided electromagnetic steel plate pieces each have one or more engaging portions and one or more engaged portions;
    wherein, when the two divided electromagnetic steel plate pieces are combined together, the one or more engaging portions of a one of the two divided electromagnetic steel plate pieces fit into the one or more engaged portions of the other of the two divided electromagnetic steel plate pieces and the one or more engaging portions of the second divided electromagnetic steel plate piece fit into the one or more engaged portions of the one of two divided electromagnetic steel plate pieces.

5. The movable assembly for a cylinder type linear motor according to claim 1, wherein the electromagnetic steel plate is constructed of two divided electromagnetic steel plate pieces, and
    the two divided electromagnetic steel plate pieces are so shaped, when combined to enclose the first and second direct drive shafts, as to be able to form one of the electromagnetic steel plates that constitutes one layer of the laminated yoke.

6. The movable assembly for a cylinder type linear motor according to claim 1, wherein each of the divided electromagnetic steel plate pieces has a contour including first and second shaft contact portions adapted to contact outer circumferential surfaces of the yoke mounting portions of the first direct drive shaft and the second direct drive shaft, respectively, and a connecting portion connecting the first and second shaft contact portions;
    wherein a shape of each contour of the two divided electromagnetic steel plate pieces are so defined that, with the two divided electromagnetic steel plate pieces combined to enclose the first and second direct drive shafts, the first direct drive shaft is held between the first shaft contact portion of one of the two divided electromagnetic steel plate pieces and the second shaft contact portion of the other of the two divided electromagnetic steel plate pieces and the second direct drive shaft is held between the second shaft contact portion of the one of the two divided electromagnetic steel plate pieces and the first shaft contact portion of the other of the two divided electromagnetic steel plate pieces, and that the connecting portion of the one of the two divided electromagnetic steel plate pieces abuts the connecting portion of the other of the two divided electromagnetic steel plate pieces, forming one electromagnetic steel plate.

7. The movable assembly for a cylinder type linear motor according to claim 6, wherein the two divided electromagnetic steel plate pieces each have one or more engaging portions and one or more engaged portions;

wherein a shape of each contour of the two divided electromagnetic steel plate pieces are so defined that, with the two divided electromagnetic steel plate pieces combined, the one or more engaging portions of the one of the two divided electromagnetic steel plate pieces fit into the one or more engaged portions of the other of the two divided electromagnetic steel plate pieces and the one or more engaging portions of the other of the two divided electromagnetic steel plate pieces fit into the one or more engaged portions of the one of the two divided electromagnetic steel plate pieces.

8. The movable assembly for a cylinder type linear motor according to claim 7, wherein the one or more engaging portions and the one or more engaged portions are formed in each of the connecting portions.

9. The movable assembly for a cylinder type linear motor according to claim 7, wherein the one or more engaging portions are provided on one side of the connecting portion where the first shaft contact portion is situated and the one or more engaged portions are provided on the other side of the connecting portion where the second shaft contact portion is situated.

10. The movable assembly for a cylinder type linear motor according to claim 6, wherein, with the two divided electromagnetic steel plate pieces combined, the connecting portions of the two divided electromagnetic steel plate pieces incline at less than 45 degrees to an virtual line connecting the centers of the first and second direct drive shafts.

* * * * *